(12) United States Patent
Pearson et al.

(10) Patent No.: US 9,089,780 B1
(45) Date of Patent: Jul. 28, 2015

(54) SYSTEMS AND METHODS FOR GAME-BASED MODIFICATION OF COMMUNICATIONS FUNCTIONALITY

(71) Applicant: Gregory A. Pearson, Inc., Dunedin, FL (US)

(72) Inventors: Gregory A. Pearson, Dunedin, FL (US); David B. Hall, New Port Richey, FL (US)

(73) Assignee: Gregory A. Pearson, Inc., Dunedin, FL (US)

( * ) Notice: Subject to any disclaimer, the term of this patent is extended or adjusted under 35 U.S.C. 154(b) by 0 days.

(21) Appl. No.: 14/472,236

(22) Filed: Aug. 28, 2014

(51) Int. Cl.
| | |
|---|---|
| *H04N 7/14* | (2006.01) |
| *A63F 13/86* | (2014.01) |
| *H04L 29/06* | (2006.01) |
| *G06Q 30/04* | (2012.01) |
| *A63F 9/06* | (2006.01) |

(52) U.S. Cl.
CPC ............... *A63F 13/86* (2014.09); *A63F 9/0612* (2013.01); *G06Q 30/04* (2013.01); *H04L 65/60* (2013.01)

(58) Field of Classification Search
CPC ...... H04N 7/183; H04N 19/00; G06F 3/0346; G08B 13/19602
USPC ............... 348/14.01–14.9, 739; 709/204, 725
See application file for complete search history.

(56) References Cited

U.S. PATENT DOCUMENTS 6,026,217 A * 2/2000 Adiletta ..................... 709/247

OTHER PUBLICATIONS

Ferreira, Francisco M.S., "Live video puzzle", https://itunes.apple.com/us/app/live-video-puzzle/id430481367?mt=8.

* cited by examiner

*Primary Examiner* — Maria El-Zoobi
*Assistant Examiner* — Julie X Dang
(74) *Attorney, Agent, or Firm* — Troutman Sanders LLP; James E. Schutz; Jay R. Anderson, Jr.

(57) ABSTRACT

Techniques for gamifying real-time network communications between users. In one implementation, a video puzzle based may be created based on scrambling a live video stream from a first user. The video puzzle may be displayed to a second user in communication with the first user. Responsive to a solving of the video puzzle by the second user, communications functionality between the first user and second user may be modified. For example, a fee assessed by a chat service or other facilitator for hosting the communications between the first user and second user may be waived or reduced.

20 Claims, 8 Drawing Sheets

300

Video Stream 301

Grid 302

Apportioned Video Stream
(Unscrambled) 303C

Scrambled Video Stream
303D

FIG. 4
400
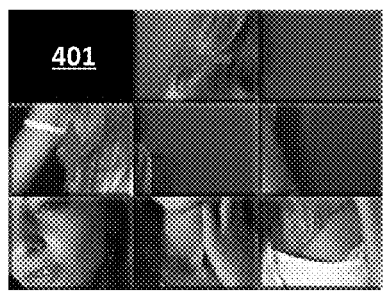
FIG. 4A
FIG. 4B
FIG. 4C
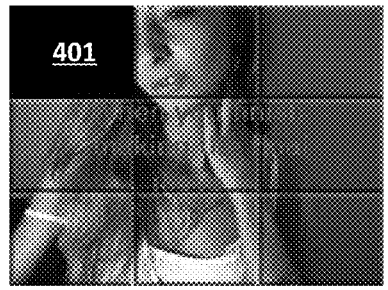
FIG. 4D
FIG. 4E 500
FIG. 5
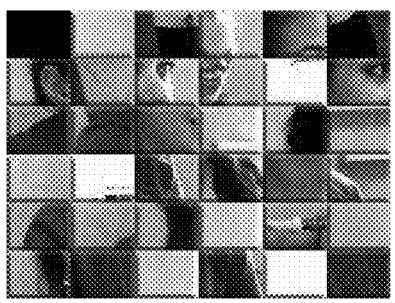
FIG. 5A
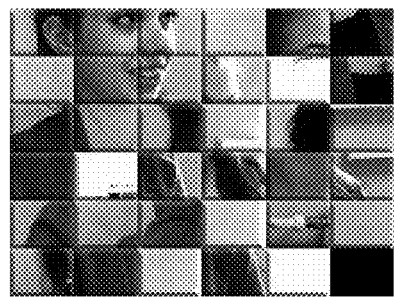
FIG. 5B
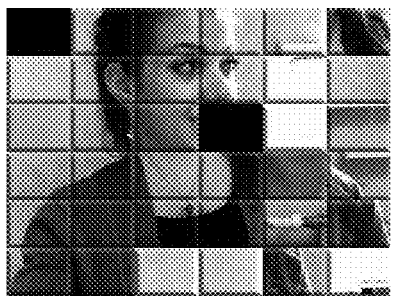
FIG. 5C
FIG. 5D
FIG. 5E

FIG. 6
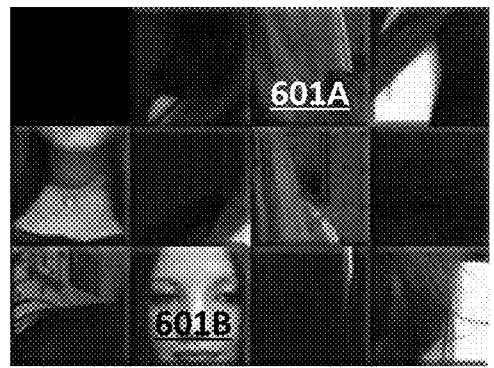
FIG. 6A
FIG. 6B

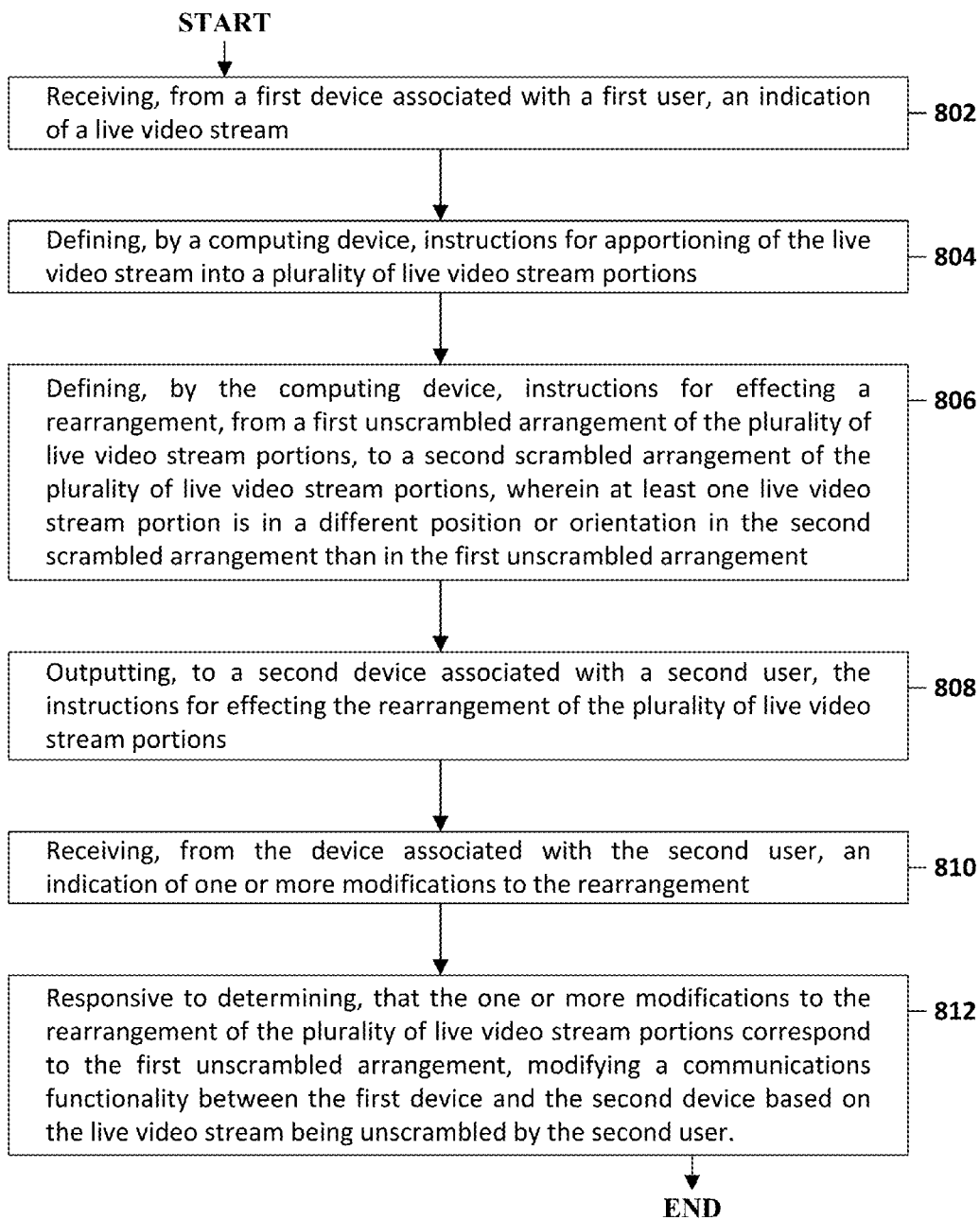

SYSTEMS AND METHODS FOR GAME-BASED MODIFICATION OF COMMUNICATIONS FUNCTIONALITY

BACKGROUND

Gamification is the use of game thinking and game mechanics in non-game contexts to engage users in solving problems. Gamification has been shown to improve user engagement, enjoyment, and retention. However, gamification has yet to be applied effectively in facilitating real-time communications between users.

SUMMARY

Some or all of the above deficiencies may be addressed by certain implementations of the disclosed technology. Certain implementations include techniques for gamifying real-time network communications between users.

According to an example implementation, a method is provided. The method may include receiving a live video stream. The live video stream may be received from a device associated with a first user. The method may further include scrambling the live video stream. Scrambling the live video stream may include determining an apportionment of the live video stream into a plurality of live video stream portions. Scrambling may further include rearranging the plurality of live video stream portions from a first unscrambled arrangement to a second scrambled arrangement. The rearranging may be such that, at least one live video stream portion of the plurality of live video stream portions is in one or more of a different position and orientation in the second scrambled arrangement than in the first unscrambled arrangement.

The method may yet further include displaying to a second user, the plurality of live video stream portions arranged according to the second scrambled arrangement. The method may also include receiving, from a second device associated with the second user, an indication of one or more rearrangements of at least two of the plurality of live video stream portions, and applying the one or more rearrangements to the live video stream portions arranged according to the second scrambled arrangement.

The method may further include, responsive to determining that a current arrangement of the plurality of live video stream portions corresponds to the first unscrambled arrangement, modifying a communications functionality between the first user and the second user based on the live video stream being unscrambled by the second user. For example, a fee normally assessed for facilitating communications between the first and second user may be waived or reduced.

According to an example implementation, another method is provided. The method may include receiving an indication of a live video stream. The live video stream may be received from a first device associated with a first user. The method may further include defining instructions for scrambling the live video stream. The instructions for scrambling the live video stream may include instructions for apportioning of the live video stream into a plurality of live video stream portions, and instructions for effecting a rearrangement, from a first unscrambled arrangement of the plurality of live video stream portions, to a second scrambled arrangement of the plurality of live video stream portions. At least one live video stream portion may be arranged in a different position or orientation in the second scrambled arrangement as compared to the first unscrambled arrangement;

The method may yet further include outputting the instructions for effecting the rearrangement of the plurality of live video stream portions. The instructions for effecting the rearrangement may be output to a second device associated with a second user.

The method may also include receiving an indication of one or more modifications to the rearrangement. The indication of the one or more modifications may be received from the device associated with the second user. The method may further include, responsive to determining that the one or more modifications to the rearrangement of the plurality of live video stream portions correspond to the first unscrambled arrangement, modifying a communications functionality between the first device and the second device based on the live video stream being unscrambled by the second user. For example, a fee normally assessed for facilitating communications between the first and second user may be waived or reduced.

According to some example implementations, various systems are provided. Each system may include a computing device, and a memory operatively coupled to the computing device and configured for storing data and instructions that may be executed by the computing device. When executed, the respective system may be caused to perform a method substantially similar to one the methods described hereinabove.

According to additional example implementations, various computer program products are provided. Each computer program product may include or be embodied in a non-transitory computer readable medium. The respective computer readable medium may store instructions that, when executed by at least one processor in a system, cause the system to perform a method substantially similar to one of the methods described hereinabove.

Other implementations, features, and aspects of the disclosed technology are described in detail herein and are considered a part of the claimed disclosed technology. Other implementations, features, and aspects may be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 4 includes FIGS. 4A-E and depicts unscrambling 400 of a live video stream, according to an example implementation.

FIG. 5 includes FIGS. 5A-E and depicts unscrambling 500 of another live video stream, according to an example implementation.

FIG. 6 includes FIGS. 6A-B and depicts various rearrangements of live video stream portions, according to an example implementation.

FIG. 8 depicts a flow diagram 800 of another method, according to an example implementation.

DETAILED DESCRIPTION

Figure 1:
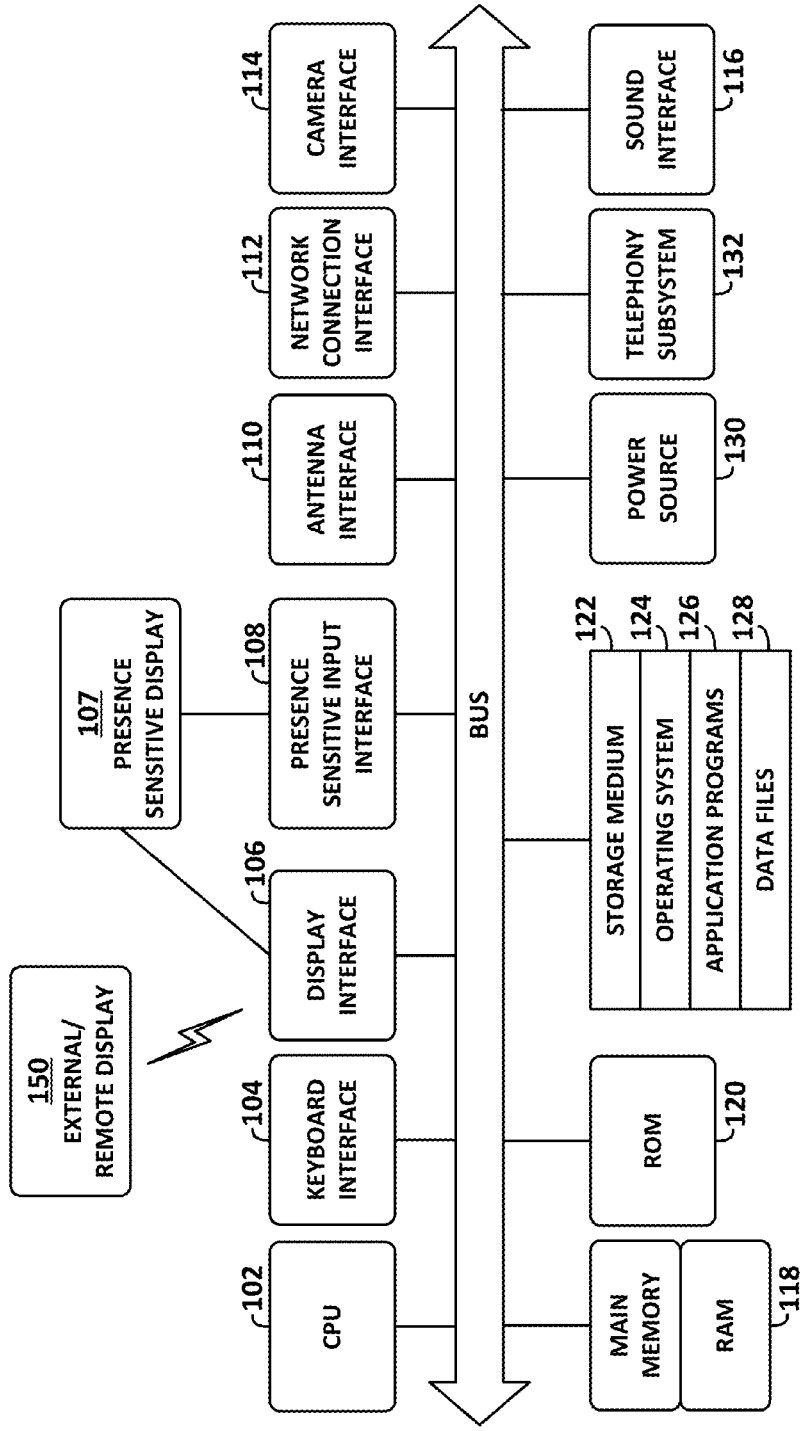
FIG. 1 depicts a block diagram of illustrative computing device architecture 100, according to an example implementation.

Implementations of the disclosed technology include techniques for gamifying real-time network communications between users. For example, one implementation may modify a fee imposed by a third party for facilitating real-time communications between two users responsive to the solving of a video puzzle.

In the following description, the disclosed technology is described primarily in regards to modifying network communications functionality based on the solving of a sliding video puzzle. However, the techniques disclosed herein may be applicable to various other forms of communications and digital tasks, and the incorporation of game-like content therewith.

Some implementations of the disclosed technology will be described more fully hereinafter with reference to the accompanying drawings. The disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums may be utilized for gamifying real-time network communications between users and will now be described with reference to the accompanying figures.

FIG. 1 depicts a block diagram of illustrative computing device architecture 100, according to an example implementation. Certain aspects of FIG. 1 may be embodied in a computing device (for example, a dedicated server computer or a mobile computing device). As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to certain some embodiments of the disclosed technology, the display interface 106 may be directly connected to a local display, such as a touch-screen display associated with a mobile computing device. In another example embodiment, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain some embodiments, the display interface 106 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 104 that provides a communication interface to a keyboard. In one example embodiment, the computing device architecture 100 may include a presence-sensitive display interface 107 for connecting to a presence-sensitive display. According to certain some embodiments of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. According to certain embodiments, a camera interface 114 is provided that acts as a communication interface and provides functions for capturing digital images from a camera or other image/video capture device. According to certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the device 100 to transmit and receive sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, or in communication with one or more peripheral devices, such as display, camera, speaker, or microphone.

In some embodiments of the disclosed technology, the computing device may include any number of hardware or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks or connections; for example, the connections that facilitate communication with any number of sensors associated with the system. The one or more network interfaces may further facilitate connection to one or more suitable networks; for example, a local area network, a wide area network, the Internet, a cellular network, a radio-frequency network, a Bluetooth-enabled network, a Wi-Fi-enabled network, a satellite-based network, any wired network, any wireless network, etc., for communication with external devices or systems.

Example Communications Systems

Figure 2A:
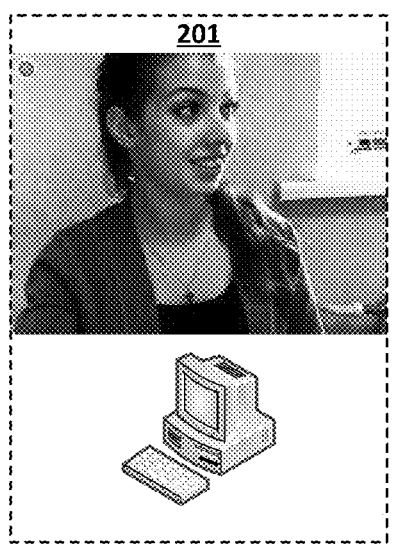
FIGS. 2A-B are schematic diagrams 200, 220 of systems for gamifying real-time network communications between users, according to an example implementation.
Figure 2A:
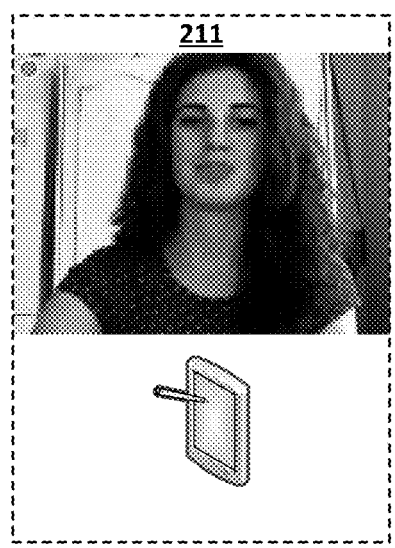
Figure 2B:
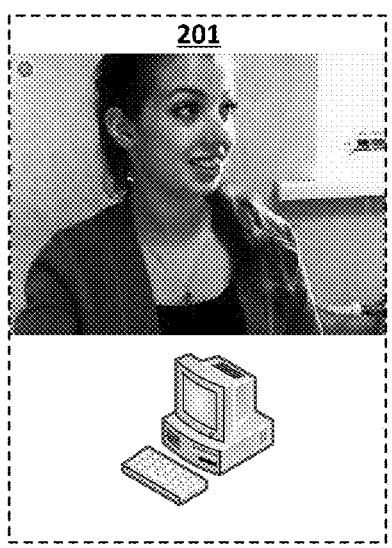
Figure 2B:
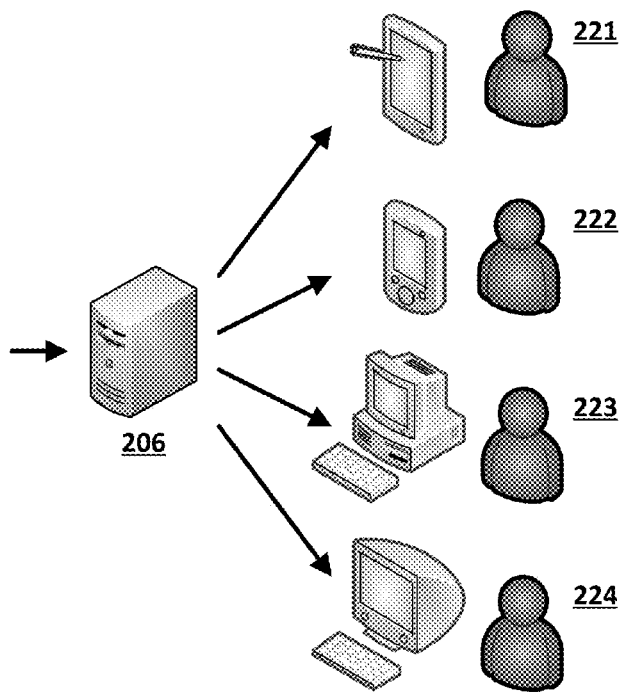

FIGS. 2A-B are schematic diagrams 200, 220 of systems for gamifying real-time network communications between users, according to an example implementation. As shown in FIG. 2A, network communications may be conducted between a first user 201 and a second user 211. The first user may engage in communications through a first network device, and the second user through a second network device. In an exemplary embodiment, one or both network devices may be, comprise, or correspond to a respective computing device. In some embodiments, the respective computing device may be associated with one or more portions of the computer architecture illustrated in FIG. 1.

The network devices may be connected by or through a network, such as the Internet or a local area network (LAN). In some implementations, a server device 206 or other intermediary may facilitate communications transmitted between the first and second network devices. For example and not limitation, the server device may host or support a video-chat service. The first user 201 may initiate a video-chat session with the second user 211 by engaging the video-chat service. One of skill in the art will recognize that the server device may be one or more computing devices and associated infrastructure (e.g., a network). In some implementations, the server device may be or include a dedicated physical server. In another implementation, the server device may be a virtual server, for example, that is hosted on a cloud-computing platform.

The server device 206 may provide various levels of support facilitating communications between the network devices. In some implementations, many or all communications between the first network device and second network device may be routed through the server device. Thus, a chat request and acceptance, and corresponding video stream data may be routed through or modified at the server device 206. In another implementation, the server may at least partially manage communication between the network devices; however, the live video stream data may not pass through the server. Instead, a first network device may direct data directly to a second network device and vice versa. Accordingly, at least a portion of the modification of the live video stream data may occur at one or more of the first or second network devices. In some such implementations, management of communications between the network devices may occur at the network devices without the involvement of a server device or other intermediary.

As shown in FIG. 2B, network communications may be also conducted between a first user 201 and a plurality of other users 221-224. In some implementations, a live video stream for a first network device may be broadcast, multicast, or otherwise transmitted to a plurality of other network devices. As previously described herein, the network devices may communicate in a P2P, client-server, or hybrid fashion.

According to certain embodiments, a first user 201 may engage in a video-chat session with a second user 211. Accordingly, a first live video stream recorded by an image capture device associated with a first network device may be sent at the first user's instruction to the second user. The second user may receive and view the first live video stream at a display associated with a second network device.

In some implementations, the first live video stream may be modified before viewing by the second user. For example, the live video stream may be scrambled. FIGS. 3A-D depict scrambling 300 of a live video stream 301, according to an example implementation. As shown in FIGS. 3A-D, live video stream 301 may be apportioned into a plurality of live video stream portions. In one implementation, a grid 302 may be applied to the live video stream 301 such that each live video stream portion 322 of the plurality of live video stream portions represents a cell 312 of the grid 302. Due to limitations of the current patent application submission format, each live video stream and portions thereof are represented in the drawings herein by permutations of a single (still) image. However, one of skill in the art will recognize the techniques described herein as being applicable to videos, animations, image streams, and other dynamic visual media.

Figure 3A:
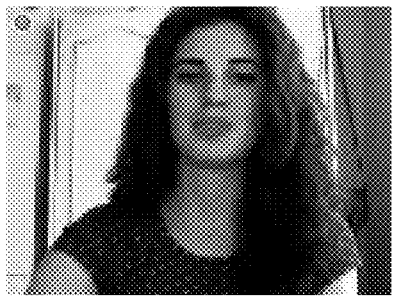
FIGS. 3A-D depict scrambling 300 of a live video stream 301, according to an example implementation.
Figure 3B:
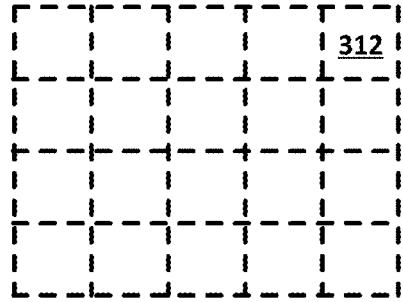
Figure 3C:
Figure 3D:
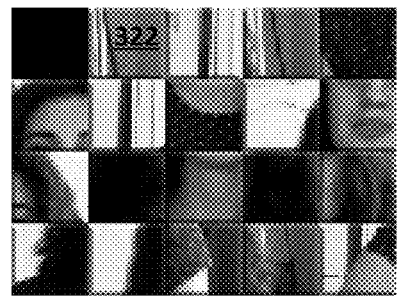

As shown in FIG. 3C, the plurality of live video stream portions may be associated with a first unscrambled arrangement 303C. As shown in FIG. 3D, the live video stream portions may be rearranged to create a second scrambled arrangement 303D. In some implementations, rearranging a plurality of live video stream portions may comprise effecting a translation or movement of a live video stream portion from a first position in an arrangement to a second position. For example, labeled live video stream portion 322 is in a different position in FIG. 3C than in FIG. 3D. In an example implementation, a position of a live video stream portion may be changed by swapping positions in the arrangement with another live video stream portion. In some implementations, a live video stream portion may also be inverted (see, e.g., 601A between FIGS. 6A and 6B), rotated (see, e.g., 601B between FIGS. 6A and 6B), or otherwise manipulated to create a scrambled arrangement.

In some implementations, apportioning or rearranging of the first live video stream may be performed at the first network device, or an intermediary such as the server device 306. In another implementation, apportioning or rearranging may not be performed until the live video stream reaches a terminal network device (e.g., the second network device). For example, the first network device or server device may instead define instructions to be forwarded to another computing device for effecting apportioning or rearranging of the live video stream. Accordingly, a server device or other intermediary can define instructions for creating a scrambled arrangement without actually receiving the live video stream. Instead, in some implementations, the instructions may be defined based on an indication of a live video stream such as a size, resolution, or aspect ratio.

The first live video stream may be displayed or otherwise presented to the second user 211 in a scrambled arrangement. As shown throughout the figures, individual live video stream portions may be indicated or designated within an arrangement by adding a visual effect, such as beveled edges. According to certain implementations, the second user may attempt to unscramble the first live video stream portion by manipulating the scrambled arrangement. In some implementations, the scrambled arrangement may be presented as a live video puzzle.

According to certain implementations, creating a video puzzle from a video stream instead of a static image may significantly increase a difficulty associated with unscrambling, or solving, a corresponding scrambled arrangement. As a person (e.g., the first user 201) or object featured in the video stream shifts or moves, the image in each video stream portion may change accordingly. Thus, the second user may be presented with a "moving" target. Moreover, as the second user is unable to directly control the first user's movements, the second user may be unable to predict how a video puzzle based on a live video stream will dynamically change. Thus, solving a live video puzzle may be considered akin to solving a jigsaw puzzle where the edges of the pieces change unpredictably.

As shown in FIGS. 4-5, the video puzzle may be a sliding video puzzle. A sliding block puzzle is a type of tour puzzle that challenges a player to slide pieces of the puzzle along certain fixed routes to establish a desired end-configuration (e.g., an unscrambled arrangement of pieces). In contrast to other tour puzzles, a sliding block puzzle prohibits lifting a piece off of the board. Accordingly, at each iteration, any individual puzzle piece is generally limited to single possible move, if any.

A sliding block puzzle may be simulated by blacking out (or omitting from display) a live video portion 401 from the arrangement, as shown in FIGS. 4A-4D. Other live video portions may be switched with the blacked-out live video portion, in effect, simulating the movement of another live video portion into a vacant slot.

FIGS. 4A-4D depict the unscrambling, or solving, of a video puzzle at various stages. In some implementations, the second user may be presented with an interface for manipulating the arrangement of live video portions. In an example implementation, a user may move or swap live video stream portions by dragging and dropping a live video stream portion to a new position or location. The user may also rotate or invert live video portions, for example, by double- or triple-clicking.

According to certain implementations, the second user may rearrange the plurality of live video portions until a current arrangement matches the original unscrambled live video stream. For example, the user-effected arrangement depicted in FIG. 4D corresponds to the original unscrambled arrangement depicted in FIG. 4E. In some implementations, once the video puzzle has been solved, any blacked-out or omitted live video stream portions may be revealed to present the original unscrambled live video stream, as shown in FIG. 4E.

In some implementations, the first user may be able to track the progress of the second user in solving the video puzzle. For example, an indication of the minimum number of correct moves remaining to solve the puzzle, or the current state of the puzzle itself, may be displayed to the first user.

According to certain implementations, communications functionality may be enabled, modified, or disabled once the video puzzle has been solved. For example, a chat service or other facilitator may normally charge a fee for hosting communications between the first user and second user. In some implementations, the fee may be waived or reduced in response to the video puzzle being solved. In another implementation, the second user 211 may be able to view the scrambled video stream of the first user 201, but may be unable to send or receive communications with the first user until the video puzzle is solved. Verbal or textual communications may then be enabled once the video puzzle has been solved.

According to certain implementations, a first user 201 and second user 211 may both direct live video streams to each other. In other words, a video chat may include a two-way exchange of live video streams. In some such implementations, communications functionality may not be modified until video puzzles based on both live video streams have been solved by their recipients. In another implementation, however, only one of the live video streams may be solved before the communications functionality is modified.

As previously described, network communications may be also conducted between a first user 201 and a plurality of other users 221-224. In some such implementations, each of the plurality of other users may receive a same video puzzle based on a live video stream, or an indication thereof. In another implementation, two or more other users may receive different (e.g., scrambled in various arrangements) video puzzles based on a same live video stream. In some implementations, communications functionality may be modified between the first user and a respective user of the plurality of other users responsive the corresponding video puzzle being solved by the respective user. Thus, in one example, respective recipient users engaged in a video chat session with a same first user may be able to have their respective communications fees waived as a corresponding video puzzle is solved.

According to certain implementations, a second user 211 or other receiving user may request or be provided with a live video stream from a source other than a first user 201. For example, the second user may request a live video stream from a content provider such as a sports network. In response, the second user may receive a video puzzle of a live sportscast. In some implementations, the second user may be charged for the live video stream until the video stream is unscrambled. Other suitable sources of streaming live video content will be apparent to one of skill in the art.

FIGS. 5A-E depict the unscrambling, or solving, of another video puzzle at various stages. The video puzzle depicted in FIGS. 5A-E comprises more live video portions than the video puzzled depicted in FIGS. 4A-E. According to certain implementations, a number of live video portions in an apportionment may be a predetermined number. In some implementations, the number may be at least partially determined by the computing device defining or performing the apportionment. In another implementation, one or more of the originating user associated with the live video stream or a receiving user may select or otherwise influence the number of live video portions for the puzzle.

In some implementations, a scrambled arrangement may be associated with a level of difficulty. The level of difficulty may be based, in part, on the number of live video portions therein. The difficulty may also be based on a degree of displacement from the initial unscrambled live video stream. In some implementations, a rearrangement may be limited to translations. In another implementation, a rearrangement may also include rotations or inversions. Various aspects of a level of difficulty may be determined automatically based on qualities of a live video stream to be apportioned, such as a resolution, color depth, or bitrate. In other implementations, the level of difficulty, and other details, may be selected or influenced by one or more the originating user and receiving user.

According to certain implementations, a time limit may be associated with a video puzzle. For example, the second user may have only two minutes to solve the video puzzle before a predetermined event occurs. In one implementation, the video puzzle may reset to its initial scrambled arrangement or a new scrambled arrangement upon expiration of time. In another implementation, communications between the first user and second user may be severed or otherwise modified. The first user and second user may then try to reestablish communication.

Other constraints may be placed on the solving of the video puzzle. For example, the second user may be limited to a predetermined number of moves, or other manipulations of the scrambled arrangement of live video stream portions. Once the number of moves is exhausted, a number of predetermined events may be triggered as previously described herein. Imposing constraints on the video puzzle may "raise the stakes" and creates a sense of urgency for the participating users. Other methods of constraining interaction with the video puzzle are contemplated and within the scope of this disclosure.

Flow Diagrams

Figure 7:
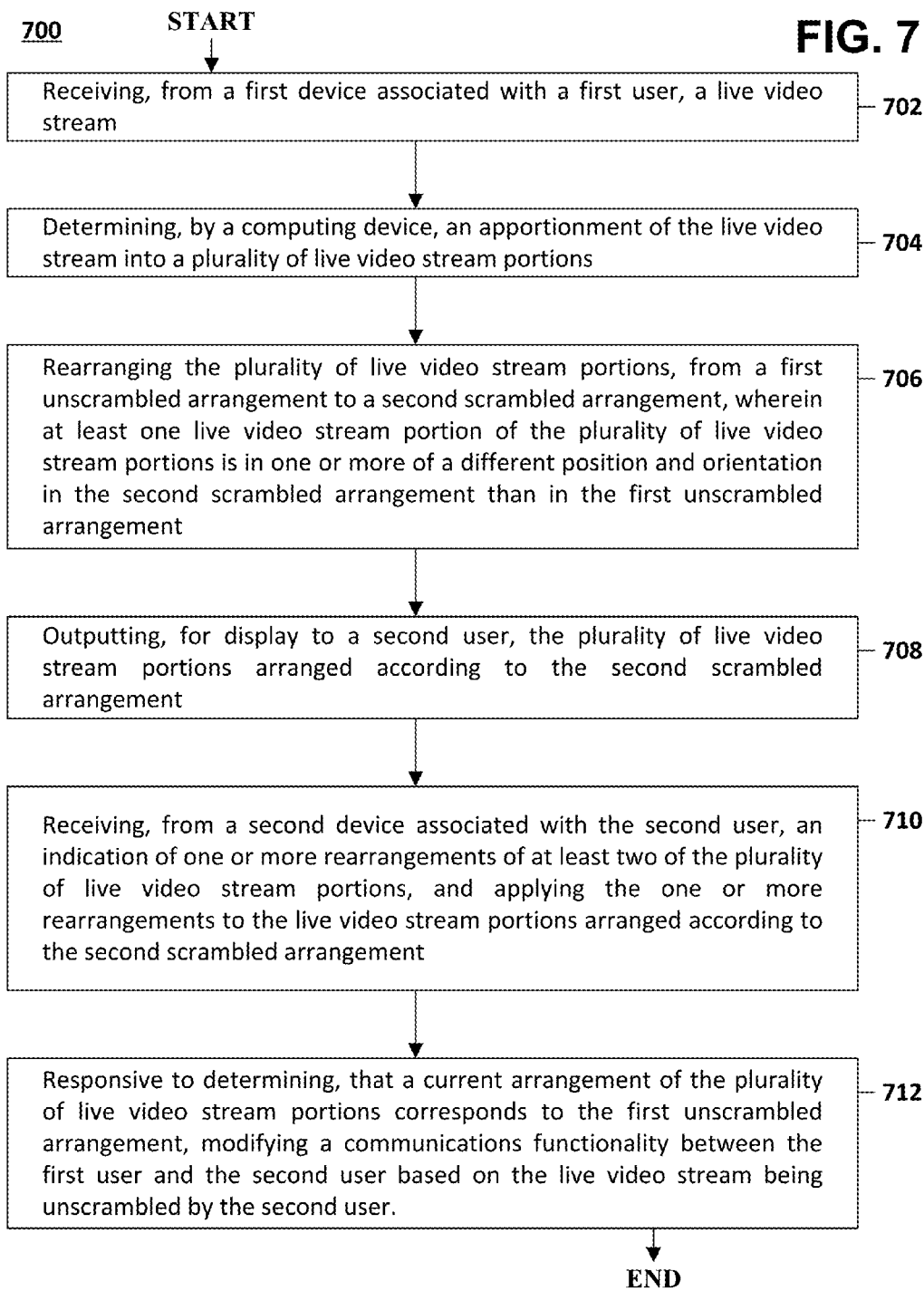
FIG. 7 depicts a flow diagram 700 of a method, according to an example implementation.

FIG. 7 depicts a flow diagram 700 of a method, according to an example implementation. As shown in FIG. 7, the method 700 starts in block 702, and, according to an example implementation, includes receiving, from a first device associated with a first user, a live video stream. In block 704, the method 700 includes determining, by a computing device, an apportionment of the live video stream into a plurality of live video stream portions. In block 706, the method 700 includes rearranging the plurality of live video stream portions, from a first unscrambled arrangement to a second scrambled arrangement, wherein at least one live video stream portion of the plurality of live video stream portions is in one or more of a different position and orientation in the second scrambled arrangement than in the first unscrambled arrangement. In block 708, the method 700 includes outputting, for display to a second user, the plurality of live video stream portions arranged according to the second scrambled arrangement.

In block 710, the method 700 includes receiving, from a second device associated with the second user, an indication of one or more rearrangements of at least two of the plurality of live video stream portions, and applying the one or more rearrangements to the live video stream portions arranged according to the second scrambled arrangement. In block 712, the method 700 includes, responsive to determining, that a current arrangement of the plurality of live video stream portions corresponds to the first unscrambled arrangement, modifying a communications functionality between the first user and the second user based on the live video stream being unscrambled by the second user.

FIG. 8 depicts a flow diagram 800 of another method, according to an example implementation. As shown in FIG. 8, the method 800 starts in block 802, and, according to an example implementation, includes receiving, from a first device associated with a first user, an indication of a live video stream. In block 804, the method 800 includes defining, by a computing device, instructions for apportioning of the live video stream into a plurality of live video stream portions. In block 806, the method 800 includes defining, by the computing device, instructions for effecting a rearrangement, from a first unscrambled arrangement of the plurality of live video stream portions, to a second scrambled arrangement of the plurality of live video stream portions, wherein at least one live video stream portion is in a different position or orientation in the second scrambled arrangement than in the first unscrambled arrangement.

In block 808, the method 800 includes outputting, to a second device associated with a second user, the instructions for effecting the rearrangement of the plurality of live video stream portions. In block 810, the method 800 includes receiving, from the device associated with the second user, an indication of one or more modifications to the rearrangement.

In block 812, the method 800 includes, responsive to determining, that the one or more modifications to the rearrangement of the plurality of live video stream portions correspond to the first unscrambled arrangement, modifying a communications functionality between the first device and the second device based on the live video stream being unscrambled by the second user.

It will be understood that the various steps shown in FIG. 7-8 are illustrative only, and that steps may be removed, other steps may be used, or the order of steps may be modified.

Certain implementations of the disclosed technology are described above with reference to block and flow diagrams of systems, methods, or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method comprising:
   receiving, from a first device associated with a first user, a live video stream;
   determining, by a computing device, an apportionment of the live video stream into a plurality of live video stream portions;
   rearranging the plurality of live video stream portions, from a first unscrambled arrangement to a second scrambled arrangement, wherein at least one live video stream portion of the plurality of live video stream portions is in one or more of a different position and orientation in the second scrambled arrangement than in the first unscrambled arrangement;
   outputting, for display to a second user, the plurality of live video stream portions arranged according to the second scrambled arrangement;
   receiving, from a second device associated with the second user, an indication of one or more rearrangements of at least two of the plurality of live video stream portions, and applying the one or more rearrangements to the live video stream portions arranged according to the second scrambled arrangement; and
   responsive to determining, that a current arrangement of the plurality of live video stream portions corresponds to the first unscrambled arrangement, modifying a communications functionality between the first user and the second user based on the live video stream being unscrambled by the second user.

2. The method of claim 1, wherein modifying the communications functionality comprises modifying a fee associated with communications between the first user and second user.

3. The method of claim 1, wherein a fee is associated with communications between the first user and the second user, the fee waived or reduced based on the live video stream being unscrambled by the second user.

4. The method of claim 1, further comprising updating the display of the plurality of live video stream portions to reflect the one or more rearrangements.

5. The method of claim 1, wherein the apportionment of the live video stream into the plurality of live video stream portions corresponds to a grid applied to the live video stream, the live video stream portions corresponding to cells of the grid.

6. The method of claim 1, wherein at least one live video stream portion of the plurality of live video stream portions is omitted or blacked out in the second scrambled arrangement of live video stream portions.

7. The method of claim 6, wherein the at least one live video stream portion of the plurality of live video stream portions that is omitted or blacked out in the second scrambled arrangement of live video stream portions, is introduced or revealed responsive to determining, that the third current arrangement of the plurality of live video stream portions corresponds to the first unscrambled arrangement.

8. The method of claim 1, wherein at least one live video stream portion of the plurality of live video stream portions is one or more of rotated and inverted in the second scrambled arrangement as compared to first unscrambled arrangement.

9. The method of claim 1, wherein:
   the live video stream is a first live video stream directed from the first user to the second user;
   a second live video stream is directed from the second user to the first user, and
   the communications functionality between the first user and the second user is modified responsive to both the first live video stream and the second live video stream being unscrambled.

10. The method of claim 1, wherein the live video stream is output to a plurality of users, and wherein a communications functionality is modified between the first user and a respective user from the plurality of users based on the live video stream being unscrambled by the respective user.

11. A system comprising:
    at least one processor;
    at least one memory operatively coupled to the at least one processor and configured for storing data and instructions that, when executed by the processor, cause the system to perform a method comprising:
    receiving, from a first device associated with a first user, a live video stream;
    determining, by the at least one processor, an apportionment of the live video stream into a plurality of live video stream portions;
    rearranging the plurality of live video stream portions, from a first unscrambled arrangement to a second scrambled arrangement, wherein at least one live video stream portion of the plurality of live video stream portions is in one or more of a different position and orientation in the second scrambled arrangement than in the first unscrambled arrangement;
    outputting, for display to a second user, the plurality of live video stream portions arranged according to the second scrambled arrangement;
    receiving, from a second device associated with the second user, an indication of one or more rearrangements of at least two of the plurality of live video stream portions, and applying the one or more rearrangements to the live video stream portions arranged according to the second scrambled arrangement; and
    responsive to determining, that a current arrangement of the plurality of live video stream portions corresponds to the first unscrambled arrangement, modifying a communications functionality between the first user and the second user based on the live video stream being unscrambled by the second user.

12. The system of claim 11, the method further comprising notifying the first user that the live video stream has been unscrambled by the second user.

13. The system of claim 11, the method further comprising providing an indication of a current arrangement of the plurality of live video stream portions to the first user.

14. The system of claim 11, wherein the live video stream is unscrambled by the second user within a predetermined time limit.

15. The system of claim 14, wherein the predetermined time limit is set at least partially by the first user.

16. The system of claim 11, wherein a number of the plurality of live video stream portions of the apportionment is set at least partially by the first user.

17. The system of claim 11, wherein a difficulty level associated with the second scrambled arrangement is set at least partially by the first user.

18. A computer program product embodied in a non-transitory computer-readable storage medium having instructions encoded thereon that, when executed by a computing device, causes the computing device to perform a method comprising:

receiving, from a first device associated with a first user, an indication of a live video stream;

defining, by a computing device, instructions for apportioning of the live video stream into a plurality of live video stream portions;

defining, by the computing device, instructions for effecting a rearrangement, from a first unscrambled arrangement of the plurality of live video stream portions, to a second scrambled arrangement of the plurality of live video stream portions, wherein at least one live video stream portion is in a different position or orientation in the second scrambled arrangement than in the first unscrambled arrangement;

outputting, to a second device associated with a second user, the instructions for effecting the rearrangement of the plurality of live video stream portions;

receiving, from the device associated with the second user, an indication of one or more modifications to the rearrangement; and responsive to determining, that the one or more modifications to the rearrangement of the plurality of live video stream portions correspond to the first unscrambled arrangement, modifying a communications functionality between the first device and the second device based on the live video stream being unscrambled by the second user.

19. The computer program product of claim 18, wherein the communications functionality is related to verbal communication.

20. The computer program product of claim 18, wherein the communications functionality is related to text communication.

* * * * *